(12) United States Patent
Kim et al.

(10) Patent No.: US 11,418,452 B2
(45) Date of Patent: Aug. 16, 2022

(54) METHOD AND ELECTRONIC DEVICE PROCESSING DATA

(71) Applicant: Samsung Electronics Co., Ltd, Suwon-si (KR)

(72) Inventors: Youngwook Kim, Suwon-si (KR); Youngki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 16/657,796

(22) Filed: Oct. 18, 2019

(65) Prior Publication Data
US 2020/0127926 A1 Apr. 23, 2020

(30) Foreign Application Priority Data
Oct. 18, 2018 (KR) .................. 10-2018-0124693

(51) Int. Cl.
*H04L 47/2441* (2022.01)
*H04L 43/0894* (2022.01)
*H04L 43/16* (2022.01)
*H04L 47/34* (2022.01)
*H04L 47/36* (2022.01)

(52) U.S. Cl.
CPC ...... *H04L 47/2441* (2013.01); *H04L 43/0894* (2013.01); *H04L 43/16* (2013.01); *H04L 47/34* (2013.01); *H04L 47/36* (2013.01)

(58) Field of Classification Search
CPC . H04L 47/2441; H04L 43/0894; H04L 43/16; H04L 47/34; H04L 47/36
See application file for complete search history.

(56) References Cited

U.S. PATENT DOCUMENTS

| | | | |
|---|---|---|---|
| 7,596,628 | B2 | 9/2009 | Aloni et al. |
| 7,636,372 | B2 | 12/2009 | Fan et al. |
| 7,966,417 | B2 | 6/2011 | Aloni et al. |
| 8,244,906 | B2 | 8/2012 | Aloni et al. |
| 8,311,059 | B2 | 11/2012 | Williams |
| 8,358,664 | B2 | 1/2013 | Fan et al. |
| 8,767,752 | B1 | 7/2014 | Tripathi et al. |

(Continued)

FOREIGN PATENT DOCUMENTS

| | | |
|---|---|---|
| EP | 1545088 A1 | 6/2005 |
| JP | 2017098907 A | 6/2017 |

OTHER PUBLICATIONS

European Search Report dated Feb. 14, 2020 in connection with European Patent Application No. 19 20 3243, 11 pages.

(Continued)

*Primary Examiner* — Michael Thier
*Assistant Examiner* — Nevena Zecevic Sandhu

(57) ABSTRACT

An electronic device including a communication circuit receiving data transmitted from another electronic device, a memory storing instructions, and at least one processor electrically connected to the communication circuit and the memory and including a control core and a plurality of operation cores. The at least one processor may execute the stored instructions to cause the control core to receive the data from the communication circuit, to classify the received data into data flows of a specified number depending on an attribute of the data, and to respectively allocate the data flows to the plurality of operation cores.

18 Claims, 8 Drawing Sheets

(56) References Cited

U.S. PATENT DOCUMENTS

| | | |
|---|---|---|
| 8,811,153 B1 | 8/2014 | Yang et al. |
| 8,848,713 B2 | 9/2014 | DiMambro |
| 8,891,543 B1 | 11/2014 | Tripathi et al. |
| 8,982,847 B2 | 3/2015 | Hassan et al. |
| 8,996,718 B2 | 3/2015 | Biswas |
| 9,356,866 B1 | 5/2016 | Sivaramakrishnan et al. |
| 9,391,907 B2 | 7/2016 | Hassan et al. |
| 9,473,394 B1 | 10/2016 | Sivaramakrishnan et al. |
| 9,571,394 B1 | 2/2017 | Sivaramakrishnan et al. |
| 9,674,088 B1 | 6/2017 | Sivaramakrishnan et al. |
| 9,942,148 B1 | 4/2018 | Sivaramakrishnan et al. |
| 9,998,373 B2 | 6/2018 | DiMambro |
| 10,116,588 B2 | 10/2018 | Chang et al. |
| 10,122,636 B2 | 11/2018 | Bergeron et al. |
| 10,362,149 B2 | 7/2019 | Biederman et al. |
| 10,404,622 B2 | 9/2019 | Tripathi et al. |
| 10,581,734 B2 | 3/2020 | Tripathi et al. |
| 2006/0104303 A1 | 5/2006 | Makineni et al. |
| 2007/0255802 A1 | 11/2007 | Aloni et al. |
| 2010/0017535 A1 | 1/2010 | Aloni et al. |
| 2010/0020819 A1 | 1/2010 | Makineni et al. |
| 2011/0019557 A1 | 1/2011 | Hassan et al. |
| 2011/0085549 A1 | 4/2011 | DiMambro |
| 2011/0090920 A1 | 4/2011 | Makineni et al. |
| 2011/0246666 A1 | 10/2011 | Aloni et al. |
| 2013/0205037 A1 | 8/2013 | Biswas |
| 2014/0211804 A1 | 7/2014 | Makikeni et al. |
| 2014/0269766 A1 | 9/2014 | Gopalasetty et al. |
| 2015/0071290 A1 | 3/2015 | DiMambro |
| 2015/0263974 A1 | 9/2015 | Jain et al. |
| 2016/0014004 A1 | 1/2016 | Bergeron et al. |
| 2016/0315875 A1 | 10/2016 | Chang et al. |
| 2017/0048142 A1 | 2/2017 | Makineni et al. |
| 2017/0318082 A1* | 11/2017 | Thakur ............... G06F 9/5027 |
| 2018/0191642 A1 | 7/2018 | Biederman et al. |
| 2018/0198709 A1 | 7/2018 | Makineni et al. |
| 2020/0351304 A1* | 11/2020 | Kurakami ........... H04L 63/1425 |

OTHER PUBLICATIONS

International Search Report dated Feb. 17, 2020 in connection with International Patent Application No. PCT/ KR2019/013552, 3 pages.

China National Intellectual Property Administration, "The First Office Action" dated Dec. 27, 2021, in connection with Chinese Patent Application No. 201910992173.9, 27 pages.

Li et al., "Multicore NPU based TCP large receive offload" College of Computer, National University of Defense Technology, Changsha, Hunan, P.R. China, vol. 38, No. 7, Jul. 2016, 6 pages.

China National Intellectual Property Administration, "Notice of Allowance" dated Jun. 9, 2022, corresponding to Chinese Patent Application No. 201910992173.9, 7 pages.

* cited by examiner

METHOD AND ELECTRONIC DEVICE PROCESSING DATA

CROSS-REFERENCE TO RELATED APPLICATION

This application is based on and claims priority under 35 U.S.C. § 119 to Korean Patent Application No. 10-2018-0124693 filed on Oct. 18, 2018 in the Korean Intellectual Property Office, the disclosure of which is incorporated by reference herein its entirety.

BACKGROUND

1. Field

The disclosure relates to a method of processing data and an electronic device performing the same.

2. Description of Related Art

With the development of information technology (IT), various types of electronic devices such as a smartphone, a tablet personal computer (PC), and the like are being widely supplied. The electronic devices may transmit or receive specified data to or from another electronic device or a base station. In particular, in recent years, with the advent of $5^{th}$ generation (5G) communication technology, an electronic device may transmit or receive the great amount of data at a high speed. The electronic device may process the data, using a processor and may obtain information included in the data.

The above information is presented as background information only to assist with an understanding of the disclosure. No determination has been made, and no assertion is made, as to whether any of the above might be applicable as prior art with regard to the disclosure.

SUMMARY

The speed at which data is processed or the efficiency of processing the data in a processor may become important as the amount of data and the transmission/reception speed increase. For example, when the processing speed of the data received from another external electronic device is not fast sufficiently, the time required for the electronic device to obtain information included in the data may not be less than the specified level. Furthermore, in this case, the time required for the electronic device to provide feedback thereof may be also delayed. The electronic device may make a user uncomfortable due to the slow processing speed regardless of the communication speed.

A packet merging function that processes packets of the same attribute into one packet may be used to increase the efficiency of data processing. For example, the packet merging function may be referred to as "offload" or "receive offload". The packet merging function may be performed in software as the function defined in operating system (OS) running in the electronic device. For example, the packet merging function may include generic receiver offload (GRO) of Linux™. For another example, the packet merging function may be performed using the hardware of the electronic device. For example, a packet competing function may be large receive offload (LRO) or receive segment coalescing (RSC) in Windows™. In the case of GRO technology, when the amount of data significantly increases compared with the processing speed of data, the overload of a processor may occur and heat generation or performance deterioration may occur in an electronic device.

Aspects of the disclosure are to address at least the above-mentioned problems and/or disadvantages and to provide at least the advantages described below. Accordingly, an aspect of the disclosure is to provide an electronic device for solving the above-described problem and problems brought up in this specification.

In accordance with an aspect of the disclosure, an electronic device may include a communication circuit configured to receive data transmitted from another electronic device, a memory storing instructions, and at least one processor electrically connected to the communication circuit and the memory and including a control core and a plurality of operation cores. The at least one processor may execute the stored instructions to cause the control core to receive the transmitted data from the communication circuit, to classify the received data into data flows of a specified number depending on an attribute of the data, and to respectively allocate the data flows to the plurality of operation cores and to cause the plurality of operation cores to integrate packets corresponding to the allocated data flow into one meta packet, to transmit the meta packet to a transmission control protocol/Internet protocol (TCP/IP) stack, and to process the integrated meta packet on the TCP/IP stack.

In accordance with another aspect of the disclosure, a method of processing data may include receiving data transmitted from an external electronic device, classifying the received data into data flows of a specified number depending on an attribute of the data, allocating the data flows to a plurality of operation cores, respectively, integrating packets corresponding to the allocated data flow into one meta packet, using one or more of the plurality of operation cores, transmitting the meta packet to a TCP/IP stack, using one or more of the plurality of operation cores, and processing the integrated meta packet on the TCP/IP stack, using one or more of the plurality of operation cores.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
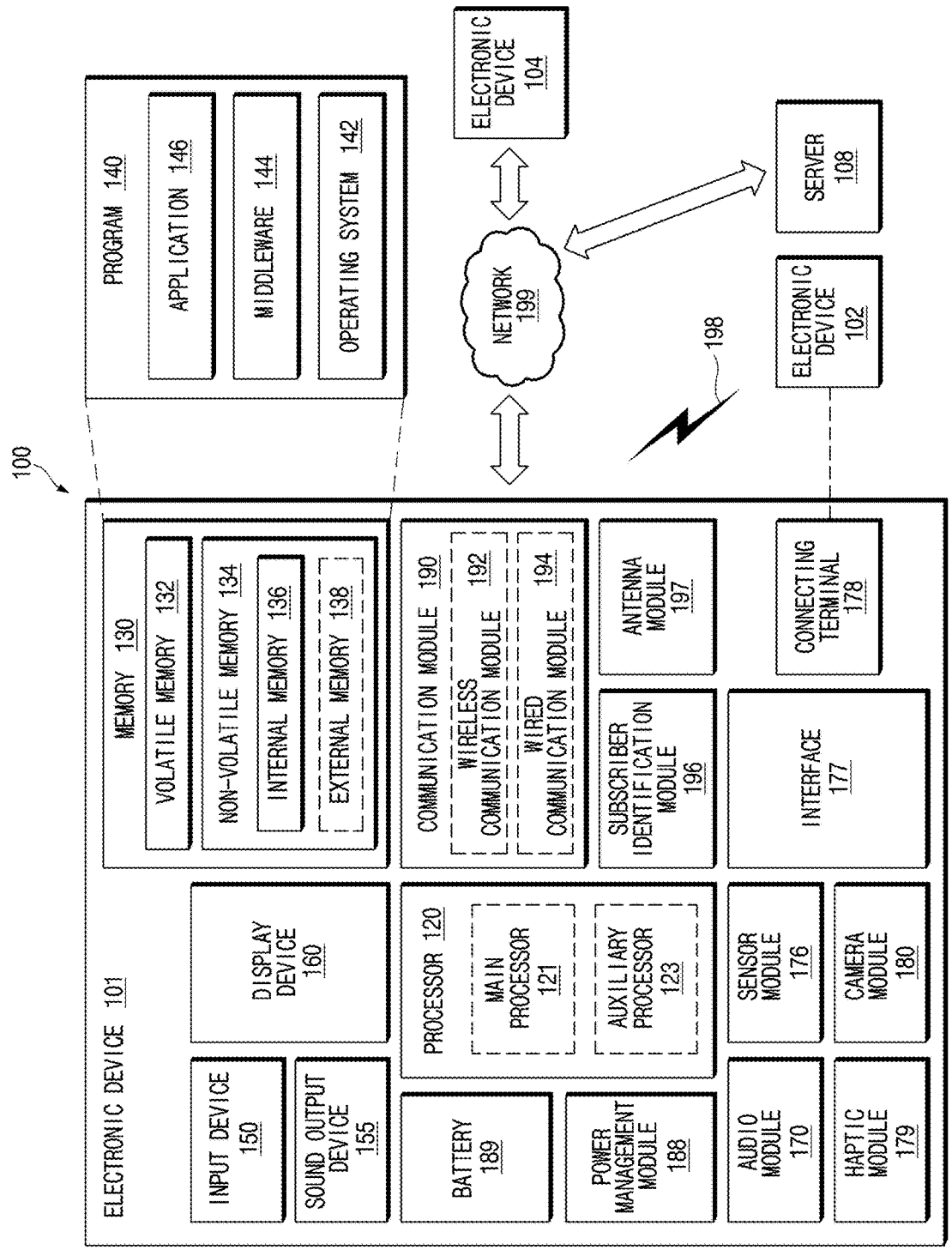
FIG. 1 illustrates a block diagram of an electronic device in a network environment, according to various embodiments.

FIG. 1 illustrates a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
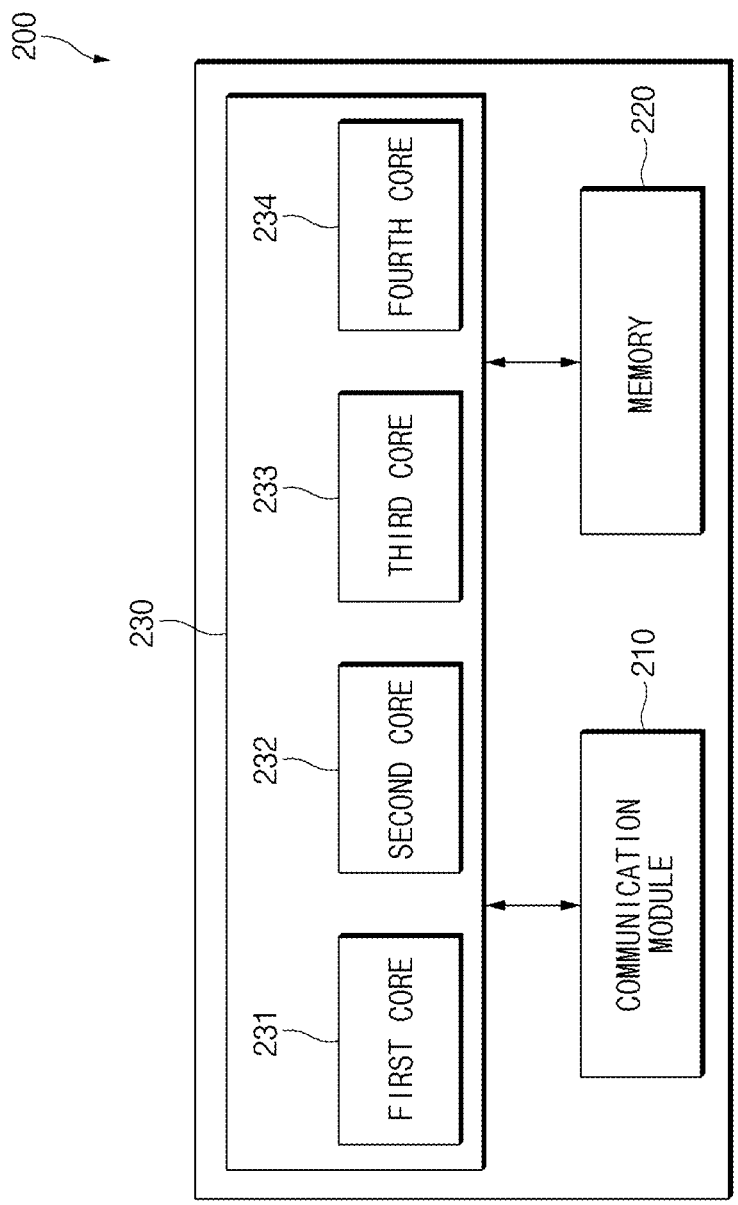
FIG. 2 illustrates a block diagram of an electronic device, according to an embodiment.

FIG. 2 illustrates a block diagram of an electronic device, according to an embodiment;

Referring to FIG. 2, an electronic device 200 (e.g., the electronic device 101 of FIG. 1) may include a communication module 210, a memory 220, and a processor 230. According to various embodiments, the electronic device 200 may further include a component not illustrated in FIG. 2 or may not include a part of the components illustrated in FIG. 2.

The communication module 210 may receive data transmitted from the outside of the electronic device 200. For example, the electronic device 200 may communicate with a base station or another electronic device. For example, the base station or the other electronic device may transmit specified data, using an electromagnetic signal. The communication module 210 may receive the specified data through the electromagnetic signal transmitted from the base station or the other electronic device. According to an embodiment, the communication module 210 may transmit the received data to the processor 230. According to various embodiments, the communication module 210 may include at least one of a communication processor (CP) or a transceiver.

The memory 220 may store at least one or more instructions. For example, the memory 220 may store instructions for the operation of the processor 230, for example, a series of operations in each of which the processor 230 receives specified data from the communication module 210 and processes the received data. The processor 230 may perform the series of operations by executing the stored instructions. For another example, the memory 220 may temporarily or permanently store data processed by the processor 230.

The processor 230 may be electrically connected to the communication module 210 and the memory 220. In an embodiment, the processor 230 may control the components included in the electronic device 200 and may process electrical signals received from the components. For example, the processor 230 may receive data transmitted from the outside, from the communication module 210 and may process the data. According to various embodiments, the processor 230 may include at least one of an application processor (AP) or a central processing unit (CPU).

According to an embodiment, the processor 230 may include a plurality of cores 231, 232, 233, and 234. For example, the processor 230 may include the first core 231, the second core 232, the third core 233, and the fourth core 234. According to various embodiments, the processor 230 may be implemented without some of the components illustrated in FIG. 2 or may be implemented to further include a component not illustrated in FIG. 2. For example, the processor 230 may omit the fourth core 234 or may further include a fifth core not illustrated in FIG. 2.

According to various embodiments, one core of a plurality of cores 231, 232, 233, and 234 may operate as a control core, and the remaining cores may operate as operation cores. For example, when a hardware interrupt according to the receiving of data occurs in a network card, the control core may be a core operating a network driver. For example, the remaining cores other than the control core may be cores that merge packets and process a network stack.

According to various embodiments, the plurality of cores 231, 232, 233, and 234 may have different performances from one another. For example, the first core 231 may be a core having the performance higher than the second core 232. For example, the first core 231 may have a core clock higher than the second core 232. For example, the first core 231 may be used as the control core. For example, in the big.LITTLE multi-core processor of ARM, the first core 231 is a big core and the second core 232 is a LITTLE core. In this case, the first core 231 may have the processing speed faster than the second core 232 but may have power consumption higher than the second core 232.

According to an embodiment, the plurality of cores 231, 232, 233, and 234 may have substantially the same performance.

According to an embodiment, the control core (e.g., the first core 231) may control overall operations of the processor 230. For example, the control core may read out instructions stored in the memory 220 and may perform a specified operation based on the instructions. For example, the control core may receive data from the communication module 210, may divide the received data into the specified number, and may allocate the divided pieces of data to operation cores.

According to an embodiment, the operation cores (e.g., 232, 233, and 234) may perform direct processing of data allocated by the control core (e.g., the first core 231), for example, a GRO operation. For example, it may be understood that the GRO operation is an operation in which the operation cores 232, 233, and 234 integrate a plurality of packets included in at least part of the allocated data in the lower layer of a TCP/IP layer into one packet. For example, when it is identified that a plurality of packets have the same attributes, the operation cores 232, 233, and 234 may combine a plurality of payloads included in the plurality of packets into one header. According to an embodiment, the GRO operation may be performed in units of packets. For example, the GRO operation may be performed on each packet in the manner in which previously accumulated packets, so-called meta packet, is combined sequentially. In this way, in an upper layer, for example, a network stack layer (e.g., a network stack layer (e.g., Internet protocol (IP)/Internet control message protocol (ICMP) layer and transmission control protocol (TCP)/user datagram protocol (UDP) layer), the plurality of packets may be recognized as one packet and may be processed rapidly.

Figure 3:
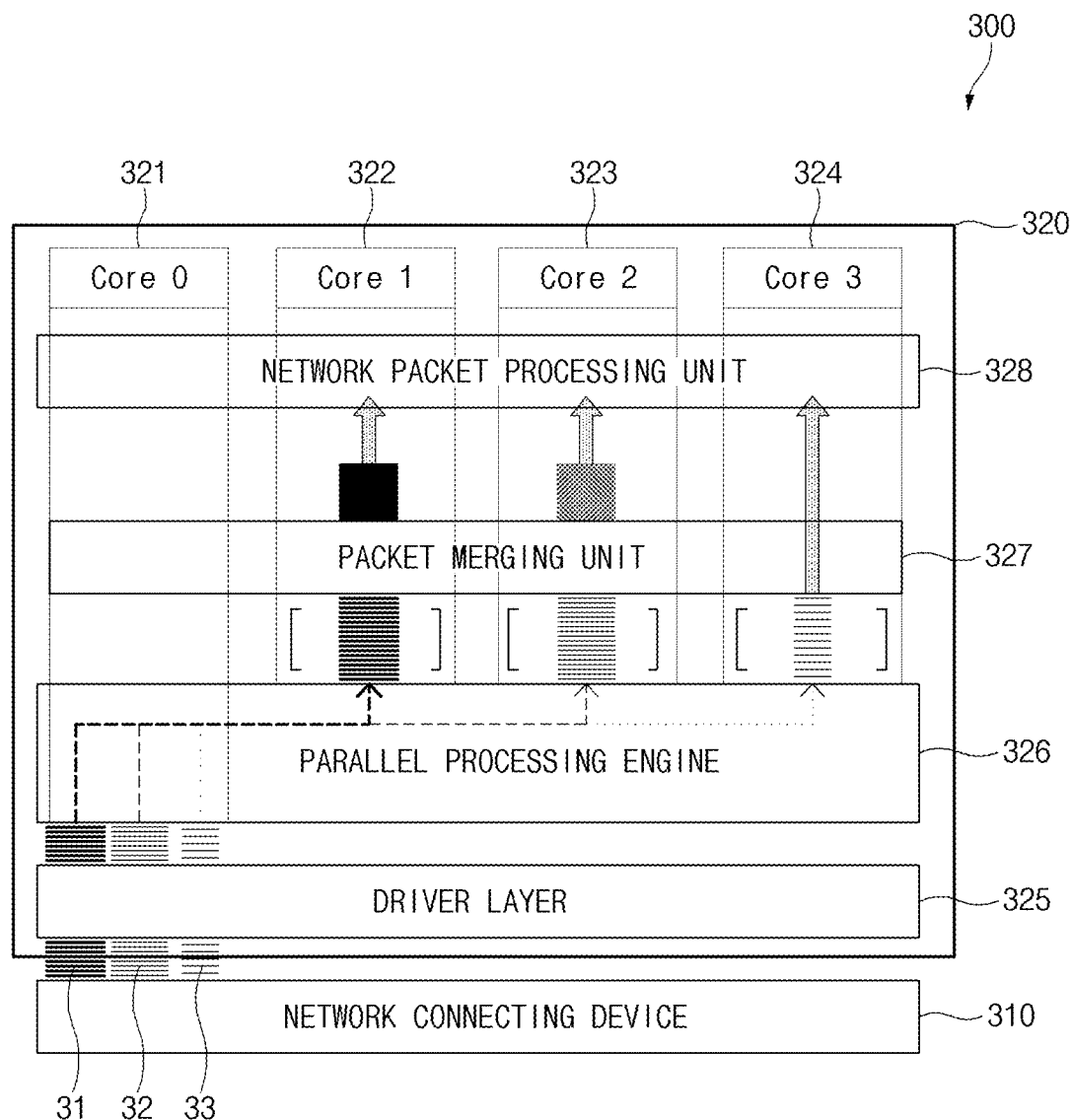
FIG. 3 illustrates a path and a method in which data is processed by an electronic device, according to an embodiment.

FIG. 3 illustrates a path and a method in which data is processed by an electronic device, according to an embodiment.

Referring to FIG. 3, the electronic device 300 may include a network connecting device 310 (e.g., a network interface card (NIC) (e.g., the communication module 210 of FIG. 2) and a processor 320 (e.g., the processor 230 of FIG. 2). According to various embodiments, the electronic device 300 is not limited to that illustrated in FIG. 3. For example, the electronic device 300 may further include a component not illustrated in FIG. 3 or may not include a part of the components illustrated in FIG. 3.

According to an embodiment, the network connecting device 310 may receive first data 31, second data 32, and third data 33 from the outside of the electronic device 300, for example, a base station or another electronic device and may transmit the first data 31, the second data 32, and the third data 33 to the processor 320. The pieces of data that are received and transmitted to the processor 320 by the network connecting device 310 are not limited to the first data 31, the second data 32, or the third data 33. For example, the pieces of data may further include fourth data; a part of the pieces of data 31, 32, and 33 illustrated in FIG. 3 may be omitted.

According to an embodiment, each of the first data 31, the second data 32, and the third data 33 may include a plurality of packets having the same attribute. For example, the first data 31 may include a plurality of packets having the first attribute; the second data 32 may include a plurality of packets having the second attribute; the third data 33 may include a plurality of packets having the third attribute. The first attribute, the second attribute, or the third attribute may be distinguished by the combination of a plurality of elements, for example, a sender IP of a packet (e.g., address and/or type), a receiver IP (e.g., address and/or type) of a packet, a sender port of a packet, and/or a receiver port of a packet. According to various embodiments, the attribute of the packet may be distinguished by the combination in which another element not included in the listed elements is added or the combination in which at least one of the listed elements is omitted.

In this specification, the first data 31, the second data 32, and the third data 33 may be referred to as a first flow, a second flow, and a third flow, respectively. For example, it may be understood that each flow is data having the same attribute.

According to an embodiment, the processor 320 may include a plurality of cores 321, 322, 323, and 324. For example, a core 0 of a plurality of cores may be used as the control core 321; a core 1, a core 2, and a core 3 may be used as the first operation core 322, the second operation core 323, and the third operation core 324, respectively. The distinction between the operation core and the control core may be exemplary; according to an embodiment, another core, not the core 0 may be used as the control core.

According to an embodiment, the control core 321 may perform pre-processing (e.g., structure suitable for OS) on the first data 31, the second data 32, and the third data 33 received from an NIC 310, using a specified software module and may divide pre-processed data into the specified number, based on the attribute of data. The control core 321 may allocate the divided pieces of data to each of the operation cores 322, 323, and 324.

According to an embodiment, the processor 320 may include a plurality of software modules. For example, the processor 320 may include a driver layer 325, a parallel processing engine 326, a packet merging unit 327, and a network packet processing unit 328. According to various embodiments, the processor 320 may further include software modules not illustrated in FIG. 3 or may not include a part of the software modules illustrated in FIG. 3.

According to an embodiment, the first operation core 322, the second operation core 323, and the third operation core 324 may process (e.g., merge packets) each data allocated by the control core 321, using a specified software module and then may transmit the processed data to the network packet processing unit 328 (e.g., TCP/IP stack).

According to various embodiments, the network packet processing unit 328 may process the packet received from the packet merging unit 327. The network packet processing unit 328 may include a network stack. The network packet processing unit 328 may include a network layer (e.g., IP, or ICMP) and a transmission layer (e.g., TCP or UDP). The network packet processing unit 328 may receive a packet from the network connecting device 310 through the driver layer 325 and the packet merging unit 327. The network packet processing unit 328 may process the received packet so as to process the received packet in a user area and then may transmit the processed packet to the user area. For example, in the IP layer, the network packet processing unit 328 may perform IP routing. Furthermore, for example, in the TCP layer, the network packet processing unit 328 may identify a TCP control block. The network packet processing unit 328 may identify the IP and the port number of the corresponding packet.

In various embodiments, each of the operation cores 322, 323, and 324 may selectively perform the GRO operation on the allocated data in the packet merging unit 327 and may transmit the processed data to the network packet processing unit 328. For example, the first operation core 322 may perform the GRO operation on the first data 31 in the packet merging unit 327 and may transmit at least one packet obtained by integrating a plurality of packets, to the network packet processing unit 328. For another example, the third operation core 324 may not perform the GRO operation on the third data 33 in the packet merging unit 327 and may transmit the third data 33 to the network packet processing unit 328.

According to an embodiment, the cores 321, 322, 323, and 324 included in the processor 320 may perform a specified operation, using the software modules. In this specification, it may be understood that the operation performed by the software module is the operation of at least one of the cores 321, 322, 323, and 324. For example, it may be understood that the operations performed by the driver layer 325 or the parallel processing engine 326 are the operations of the control core 321. For another example, the operations performed by the packet merging unit 327 are operations of the first operation core 322, the second operation core 323, and the third operation core 324.

According to an embodiment, the driver layer 325 may convert pieces of data, for example, packets included in the first data 31, the second data 32, and the third data 33, received from the network connecting device 310 in the form used by the processor 320, for example, the form including a packet structure. According to various embodiments, the packet structure may be in the form of at least one of "sk_buff", "mbuf", or "NET_BUFFER_LIST".

According to an embodiment, the parallel processing engine 326 may divide pieces of data received from the driver layer 325 based on the attributes of packets. For example, the parallel processing engine 326 may divide the pieces of data into the first data 31 having the first attribute, the second data 32 having the second attribute, and the third data 33 having the third attribute.

According to an embodiment, the parallel processing engine 326 may allocate the divided pieces of data to a specified operation core based on a specified policy (e.g., the distinction of a data flow). For example, the parallel processing engine 326 may allocate the first data 31 to the first operation core 322, may allocate the second data 32 to the second operation core 323, and may allocate the third data 33 to the third operation core 324. According to various embodiments, the specified policy may be based on one manner of "round-robin", "random", "load-aware", "user-defined", or "pre-defined".

According to an embodiment, the packet merging unit 327 may perform a packet merging (e.g., GRO) operation on each data allocated by the parallel processing engine 326. For example, the packet merging unit 327 may perform the packet merging operation on the first data 31, using the first operation core 322 and may perform the packet merging operation on the second data 32, using the second operation core 323. The packet merging unit 327 may transmit the first data 31 or the second data 32, on which the packet merging operation is performed, to the network packet processing unit 328 by using the first operation core 322 or the second operation core 323.

According to an embodiment, when a specified condition (e.g., the value change of packet per second (PPS)) is satisfied, the packet merging unit 327 may not perform the packet merging operation on a part of data. For example, when the third data 33 satisfies a specified condition, the packet merging unit 327 may not perform the packet merging operation on the third data 33. In this case, the packet merging unit 327 may transmit the third data 33, on which the packet merging operation is not performed, to the network packet processing unit 328 by using the third operation core 324.

According to an embodiment, the electronic device 300 may maintain the load of each core in the processor 320, which is caused by the performing of the packet merging operation, to the specified level or less. For example, even though the amount of data is not less than a specified level because the electronic device 300 divides data using the parallel processing engine 326 and then performs the packet merging operation, the load, which is caused by the packet merging operation and which occurs in each core inside the processor 320 may not be greater than a specified level. Moreover, because the electronic device 300 selectively performs the packet merging operation under the specified condition, the electronic device 300 may perform efficient data processing.

In this specification, the description given with reference to FIG. 3 may be identically applied to components which have the same reference numerals as the components of the electronic device 300 illustrated in FIG. 3.

Figure 4:
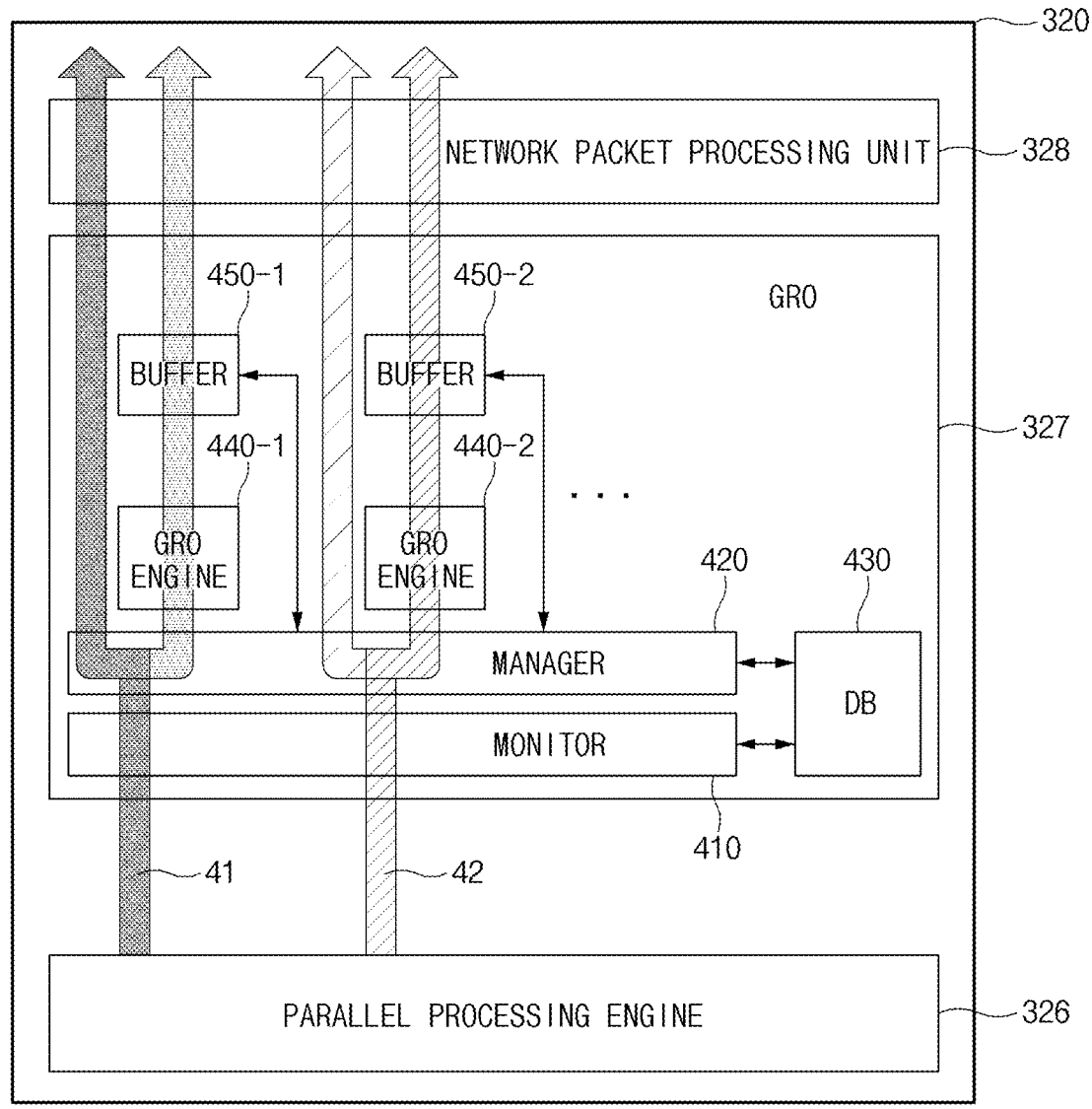
FIG. 4 illustrates a view for describing a procedure in which a GRO operation is selectively performed by an electronic device, according to an embodiment.

FIG. 4 illustrates a view for describing a procedure in which a packet merging operation is selectively performed by an electronic device, according to an embodiment.

Referring to FIG. 4, the processor 320 may be a software module and may include the parallel processing engine 326, the packet merging unit 327, and the network packet processing unit 328. According to various embodiments, the processor 320 is not limited to that illustrated in FIG. 4. For example, the processor 320 may further include a software module not illustrated in FIG. 4 or may not include a part of the software modules illustrated in FIG. 4.

According to an embodiment, the processor 320 may process first data 41 and second data 42. For example, the first data 41 and the second data 42 may be the same as or similar to one of the first data 31, the second data 32, or the third data 33 illustrated in FIG. 3.

According to an embodiment, the packet merging unit 327 may include a monitor 410, a manager 420, a database (DB) 430, a first GRO engine 440-1, a second GRO engine 440-2, a first buffer 450-1, and a second buffer 450-2. According to various embodiments, the packet merging unit 327 may further include a component not illustrated in FIG. 4. For example, the packet merging unit 327 may further include at least one GRO engine or at least one buffer.

According to an embodiment, the monitor 410 may receive data including a plurality of packets from the parallel processing engine 326 and may perform pre-processing on the packets. According to an embodiment, when the packet included in the received data is a TCP/IP packet, the monitor 410 may generate a flow ID of the packet, may update detailed information (e.g., the number of received packets or a point in time when a packet is received last) about the flow ID, and may store the content of the flow ID and the detailed information in the DB 430. According to an embodiment, when the packet included in the received data is not the TCP/IP packet, the monitor 410 may not generate the flow ID.

According to an embodiment, the flow ID may be a hash value obtained by a hash function from at least one or the combination of at least two or more of a sender IP address of a packet, a receiver IP address of a packet, a sender port of a packet, and a receiver port of a packet.

According to an embodiment, after updating information about the packet, which is included in the received data, in the DB 430, the monitor 410 may transmit the packet to the manager 420. Various embodiments of an operation in which the monitor 410 processes the packet will be further described in FIG. 7.

According to an embodiment, the manager 420 may determine whether to perform the GRO operation on the packet received from the monitor 410. In an embodiment, the manager 420 may receive the information about the packet received from the monitor 410, from the DB 430. The manager 420 may determine whether to perform the GRO operation on the packet, based on the received information. For example, the manager 420 may determine that the first data 41 does not need the GRO operation and may transmit packets included in the first data 41 to the network packet processing unit 328. For another example, the manager 420 may determine that the second data 42 needs the GRO operation and may transmit packets included in the second data 42, to the second GRO engine 440-2. Various embodiments of an operation in which the manager 420 processes the packet will be further described in FIG. 8.

According to an embodiment, the DB 430 may store pieces of information about the processing packets included in the first data 41 or the second data 42. For example, the DB 430 may store information about the received packet, for example, a flow ID, pieces of detailed information corresponding to the flow ID, or pre-stored various pieces of threshold value information. For example, the DB 430 may store detailed information (e.g., the number of received packets, a point in time when a packet is received last, or the like) about a flow ID, information for determining quality of service (QoS), and the flow ID. For example, the information for determining QoS may include at least one of a threshold value of PPS, an interface configured to perform the GRO operation, an interface not configured to perform the GRO operation, an IP (e.g., address and/or type) configured to perform the GRO operation, and an IP (e.g., address and/or type) not configured to perform the GRO operation. For example, the IP configured to perform the GRO operation and/or the IP not configured to perform the GRO operation may be an IP stored in advance in the database.

According to an embodiment, the DB 430 may exchange specified information with the monitor 410 or the manager 420. For example, the monitor 410 may update pieces of information stored in the DB 430, for example, pieces of detailed information corresponding to the specified flow ID. For example, when a new packet is received, the monitor 410 may update pieces of detailed information corresponding to the flow ID of the packet, for example, the number of received packets having the flow ID, a point in time when a packet is received last, or the like. For another example, the manager 420 may read out pieces of information stored in the DB 430 and may determine whether to perform the GRO operation on a packet, based on the pieces of information.

According to an embodiment, the first GRO engine 440-1 and the second GRO engine 440-2 may be mapped to the first buffer 450-1 and the second buffer 450-2, respectively; each of the first GRO engine 440-1 and the second GRO engine 440-2 may perform the GRO operation on packets included in each data. For example, the dedicated buffer of each GRO engine may be allocated to or included in a memory. For example, the second GRO engine 440-2 may accumulate each of payloads with respect to packets included in the second data 42 and may combine the accumulated payloads with one header. In an embodiment, whenever a new packet is received from the manager 420, the first GRO engine 440-1 or the second GRO engine 440-2 may combine the new packet with the previously accumulated packet. In this specification, the previously accumulated packet may be referred to as a "meta packet".

According to an embodiment, the first buffer 450-1 and the second buffer 450-2 may be mapped to the first GRO engine 440-1 and the second GRO engine 440-2, respectively; each of the first buffer 450-1 and the second buffer 450-2 may store the packet on which the GRO operation is performed. For example, the second buffer 450-2 may store the result obtained by performing the GRO operation on packets included in the second data 42, for example, one packet obtained by combining a plurality of packets. In an embodiment, whenever a new packet is received by the first GRO engine 440-1 or the second GRO engine 440-2, the first buffer 450-1 or the second buffer 450-2 may update the previously accumulated packet to the packet obtained by combining the new packet with the previously accumulated packet.

Figure 5:
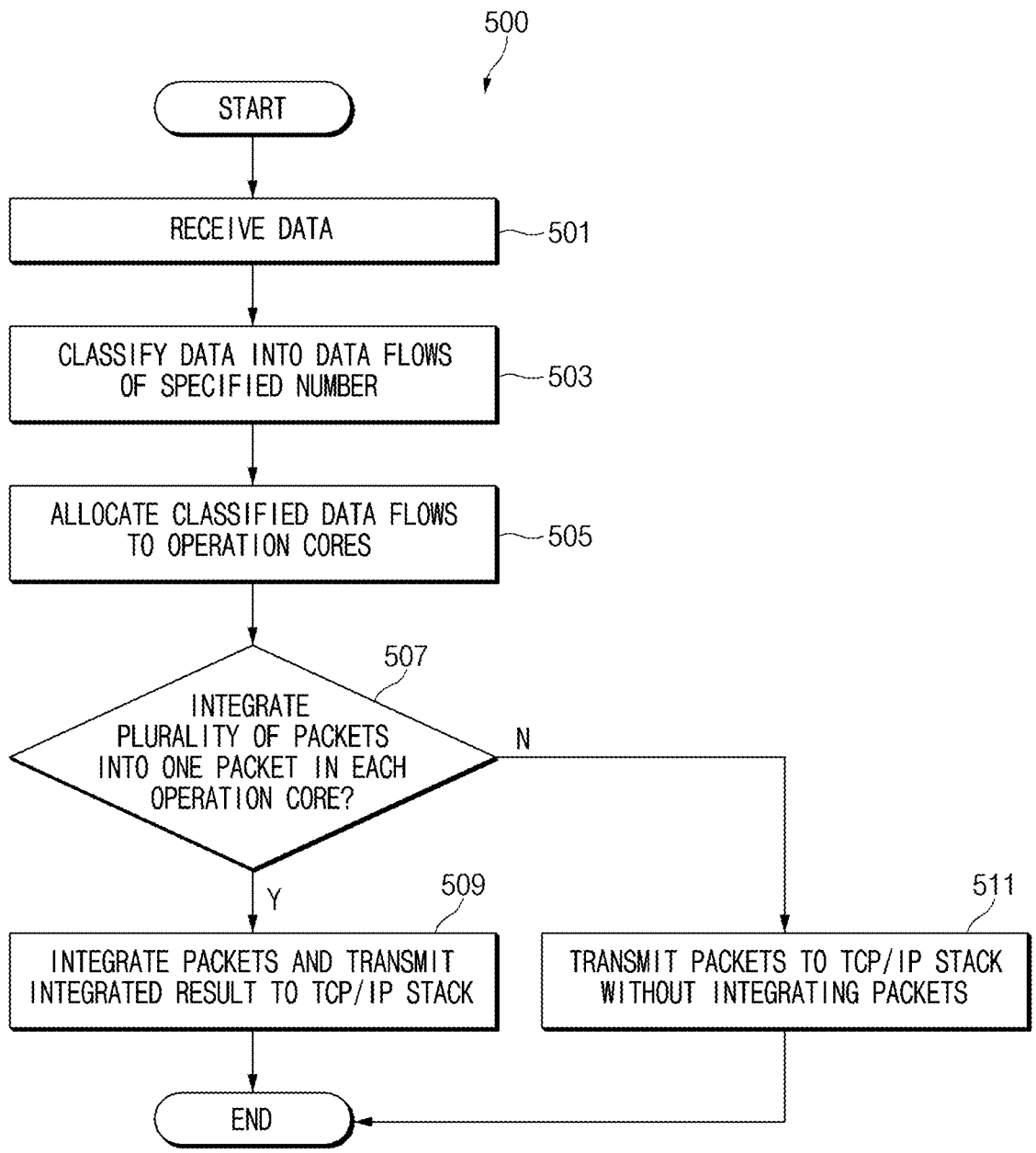
FIG. 5 illustrates a flowchart of a method in which an electronic device effectively processes data, according to an embodiment.

FIG. 5 illustrates a flowchart of a method in which an electronic device effectively processes data, according to an embodiment.

Referring to FIG. 5, a method 500 of processing data may include operation 501 to operation 507. According to an embodiment, it may be understood that operation 501 to operation 507 are performed by the electronic device 200 or the processor 230 illustrated in FIG. 2.

According to an embodiment, in operation 501, the processor may receive data from a communication module (e.g., the communication module 210 of FIG. 2). For example, the processor may receive the data received from an external electronic device through the communication module.

According to an embodiment, in operation 503, the processor may classify the received data into data flows of the specified number. For example, the processor may classify the received data based on the attribute of data, using a control core (e.g., the control core 321 of FIG. 3).

In operation 505, the processor may allocate and transmit the classified data flows to operation cores (e.g., the operation cores 322, 323, and 324 of FIG. 3). For example, the processor may transmit a first data flow having a first attribute to a first operation core and may transmit a second data flow having a second attribute to a second operation core.

According to an embodiment, in operation 507, the processor may determine whether to perform an operation (e.g., a GRO operation) of integrating a plurality of packets corresponding to each data flow into one packet in each operation core. For example, the first operation core may determine whether to integrate a plurality of packets corresponding to the first data flow allocated to the first operation core into one meta packet. For another example, the second operation core may determine whether to integrate a plurality of packets corresponding to the second data flow allocated to the second operation core into one meta packet. According to an embodiment, the processor may allow each of the operation cores to determine whether to integrate a plurality of packets corresponding to each data flow into one packet, based on a specified first condition. For example, the specified first condition may include at least one of PPS information, network interface information, or IP information (e.g., IP type). For example, when the PPS (packet per second) belongs to a specified first range, each operation core may determine to perform packet integration. For another example, when the PPS belongs to a specified second range, each operation core may determine not to perform the packet integration. The lower limit of the first range may exceed the upper limit of the second range. For example, when a network interface is a specified first network interface, each operation core may determine to perform the packet integration. For another example, when a network interface is a specified second network interface, each operation core may determine not to perform packet integration. For example, when the IP (e.g., a source address IP and/or a destination address IP) of data corresponds to a specified first IP (e.g., TCP), each operation core may determine to perform the packet integration. For another example, when the IP of data corresponds to a specified second IP, each operation core may determine not to perform the packet integration.

According to various embodiments, when determining to perform the packet integration, in operation 509, the processor may cause each operation cores to integrate packets and to transmit the integrated result to a TCP/IP stack (e.g., the network packet processing unit 328 of FIG. 3). For example, each operation core may integrate packets of the data flow allocated to itself into one meta packet and may transmit the integrated meta packet to the TCP/IP stack. Each operation core may process the meta packet corresponding to the data flow allocated to itself on the TCP/IP stack. According to an embodiment, each of the operation cores may process the integrated packet on the TCP/IP stack. For example, the first operation core may process the integrated packet (e.g., meta packet) of the first data flow on the TCP/IP stack. For example, the first operation core may store the integrated packet of the first data in a buffer associated with a GRO engine, using the GRO engine associated with the first operation core and may process the integrated packet stored in the buffer on the TCP/IP stack. For example, the first operation core may process the integrated packet on the TCP/IP stack, by reading out the integrated packet stored in the buffer on the TCP/IP stack. For example, after the control core classifies data, each operation core may perform the packet integration of the data flow, which is allocated to itself, and may perform processing on the TCP/IP stack.

According to various embodiments, when determining not to perform the packet integration, in operation 511, the processor may cause each operation cores to transmit the packets to the TCP/IP stack (e.g., the network packet processing unit 328 of FIG. 3) without integrating packets. For example, each of the operation cores may transmit packets of the data flow allocated to itself to the TCP/IP stack.

In the embodiment of FIG. 5, because each of the operation cores processes the classified data, the received data may be processed in parallel by a plurality of operation cores. In the operation after the classification of data, the packets corresponding to the allocated data flow may be processed in series in each operation core up to a network stack (TCP/IP stack) by each operation core.

According to an embodiment, in an operation of transmitting packets to the TCP/IP stack in operation 509 and operation 511, each of the operation cores may determine whether to transmit packets to the TCP/IP stack, based on the specified second condition. The specified second condition may include whether the size of the accumulated packet is not less than a threshold value, whether the number of accumulated packets is not less than a threshold value, or whether a time period in which a GRO operation is performed on the accumulated packet is not less than a threshold value.

The electronic device may effectively process data through operation 501 to operation 507. For example, when it is advantageous that the electronic device does not perform a GRO operation based on the attribute of data, the electronic device may not perform the GRO operation; when it is advantageous that the electronic device performs the GRO operation, the electronic device may perform the GRO operation. For another example, before performing the GRO operation, the electronic device may divide data to allocate the divided pieces of data into a plurality of cores, thereby preventing the load of a specified level or more from occurring in a core due to the GRO operation.

Figure 6:
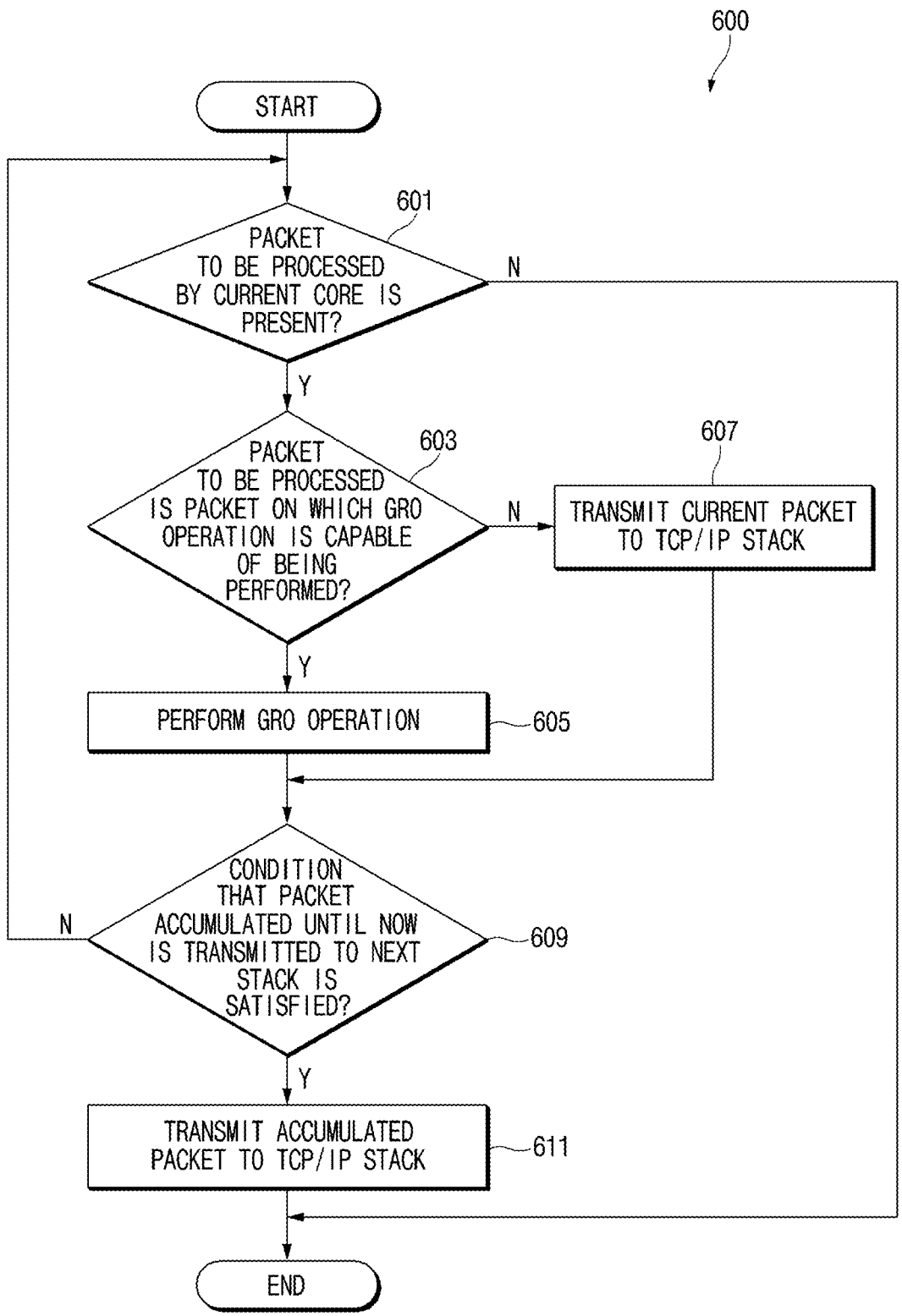
FIG. 6 illustrates a flowchart of a method in which each core included in an electronic device processes data, according to an embodiment.

FIG. 6 illustrates a flowchart of a method in which each core included in an electronic device processes data, according to an embodiment.

Referring to FIG. 6, a method 600 in which each core processes data may include operation 601 to operation 611. For example, the operation 601 to the operation 611 may be detailed operations of operation 507 illustrated in FIG. 5. According to an embodiment, it may be understood that operation 601 to operation 611 are performed by the processor 230 or the operation cores 232, 233, and 234 illustrated in FIG. 2.

According to an embodiment, in operation 601, the processor may determine whether a packet to be processed is present in each operation core. For example, each of the operation cores may determine whether the data allocated by the control core is left. When the packet to be processed is left, the processor may perform operation 603; when the packet to be processed is not left, the processor may terminate the operation.

According to an embodiment, in operation 603, the processor may determine whether the packet to be processed is a packet on which a GRO operation is capable of being performed. For example, the operation core may determine whether the flow ID corresponding to the packet is received. For example, the operation core may determine whether the flow ID corresponding to the packet is received, by identifying the flow ID generated by a monitor (e.g., the monitor 410 of FIG. 4) using a manager (e.g., the manager 420 of FIG. 4).

For another example, even though the flow ID corresponding to the packet is received, the operation core may determine whether information corresponding to the flow ID is present in a database. In an embodiment, when the flow ID corresponding to the packet is received and the information corresponding to the flow ID is present in the database, the operation core may determine that the packet is a packet on which the GRO operation is capable of being performed. In another embodiment, when the flow ID corresponding to the packet is not received or when the information corresponding to the flow ID is not present in the database even though the flow ID received, the operation core may determine that the packet is a packet on which the GRO operation is not capable of being performed and may perform operation 607. According to an embodiment, the flow ID may be a hash value obtained by a hash function from at least one or the combination of a sender IP of a packet, a receiver IP of a packet, a sender port of a packet, and a receiver port of a packet.

According to an embodiment, in operation 605, because the packet is a packet on which the GRO operation is capable of being performed, the processor may perform the GRO operation on the packet. However, when it is determined that it is advantageous that the processor does not perform the GRO operation based on the attribute (e.g., the sender IP of a packet, the receiver IP of a packet, a sender port of a packet, and/or a receiver port of a packet) of the packet while the processor performs operation 605, the processor may not perform the GRO operation. Various embodiments thereof will be further described in FIG. 8.

According to an embodiment, in operation 607, because the packet is a packet on which the GRO operation is not capable of being performed, the processor may not perform the GRO operation on the packet. The processor may transmit the packet to the TCP/IP stack. For example, the processor may control the current core such that the current core processes the packet without performing the GRO on the TCP/IP stack.

In operation 609, the processor may determine whether a condition that the packet accumulated until now is transmitted to the next stack, for example, the TCP/IP stack is satisfied. For example, the condition may include one of whether the size of the accumulated packet is not less than a threshold value, whether the number of accumulated packets is not less than a threshold value, or whether a time period in which the GRO operation is performed on the accumulated packet is not less than a threshold value. In an embodiment, when one of the conditions is satisfied, the processor may perform operation 611; when none of the conditions is satisfied, the processor may return to operation 601 and then may process a new packet.

According to an embodiment, in operation 611, because the condition that the packet accumulated until now is transmitted to the next stack is satisfied, the processor may transmit the accumulated packet to the TCP/IP stack and may terminate the operation. For example, the processor may transmit information of the packet accumulated in the buffer, to the TCP/IP stack. For example, the processor may transmit the pointers of packets stored in the buffer to the TCP/IP stack. According to an embodiment, the processor may control the current core such that the current core processes the accumulated packet on the TCP/IP stack.

Figure 7:
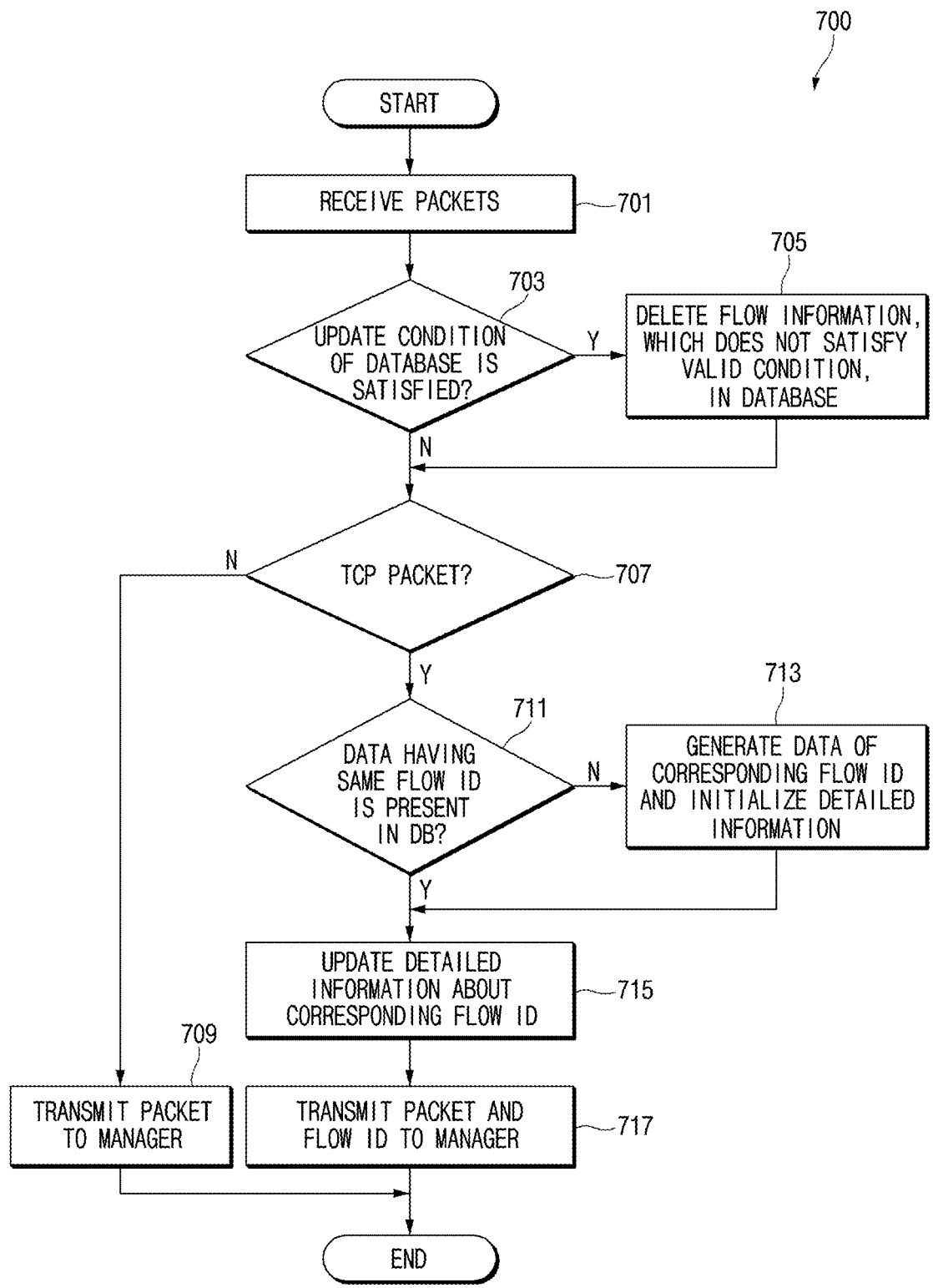
FIG. 7 illustrates a flowchart of an operation of a monitor included in an A-GRO module in an electronic device, according to an embodiment.

FIG. 7 illustrates a flowchart of an operation of a monitor included in an advanced-GRO (A-GRO) module in an electronic device, according to an embodiment.

Referring to FIG. 7, when an electronic device processes data, operation 700 of the monitor included in an A-GRO module (e.g., the packet merging unit 327 of FIG. 3) may include operation 701 to operation 717. For example, operation 701 to operation 717 may be detailed operations of the monitor in operation 507. According to an embodiment, it may be understood that operation 701 to operation 717 are performed by the processor 230 or the operation cores 232, 233, and 234 illustrated in FIG. 2.

According to an embodiment, in operation 701, the monitor (e.g., the monitor 410 of FIG. 4) may receive data including a plurality of packets from a parallel processing engine (e.g., the parallel processing engine 326 of FIG. 4). According to an embodiment, the monitor may sequentially process a plurality of packets included in the received data. For example, the monitor may sequentially process the received plurality of packets one by one.

According to an embodiment, in operation 703, the monitor may determine whether an update condition of a database (e.g., the DB 430 of FIG. 4) is satisfied. According to an embodiment, the update condition may include whether the time of a threshold value or more elapses from a point in time when the database is updated last. In an embodiment, when the update condition of the database is satisfied, for example, when the time (e.g., 5000 ms) of the threshold value or more elapses from a point in time when the database is updated last, the monitor may perform operation 705. In an embodiment, when the update condition is not satisfied, for example, when the time of the threshold value or more does not elapse from a point in time when the database is updated last, the monitor may perform operation 707.

According to an embodiment, in operation 705, the monitor may update flow information that is present in the database. For example, the monitor may delete flow information, which does not satisfy a valid condition, in the flow information that is present in the database. According to an embodiment, the valid condition may at least include whether the time (e.g., 5000 ms) of the threshold value or more does not elapse from a point in time when the packet corresponding to the corresponding flow is last received, with respect to an arbitrary flow, for example, data having an arbitrary attribute. In an embodiment, when the time of the threshold value or more elapses from a point in time when the packet corresponding to the flow is last received, the monitor may determine whether the flow does not satisfy the valid condition with respect to an arbitrary flow. In this case, the monitor may delete the flow information about the flow from the database.

According to an embodiment, in operation 705, the monitor may determine the valid condition for all flows that are present in the database. For example, the monitor may perform operation 705 until the flow for which the valid condition is not determined is not present anymore. For another example, the monitor may perform operation 705 until the flow is not present in the database anymore. The monitor may perform operation 707 when the valid condition is determined with respect to all flows that are present in the database.

According to an embodiment, in operation 707, the monitor may determine whether the received packet is a TCP packet. In an embodiment, when the received packet is not the TCP packet, for example, when the received packet is a UDP packet, the monitor may perform operation 709. When the received packet is the TCP packet, the monitor may perform operation 711.

According to an embodiment, when the received packet is not the TCP packet, in operation 709, the monitor may transmit the packet to a manager (e.g., the manager 420 of FIG. 4) and may terminate the operation. In this case, information associated with the flow ID of the packet may not be generated in a DB and may not be transmitted to the manager.

According to an embodiment, in operation 711, the monitor may determine whether data having the same flow ID as the flow ID of the received packet, for example, the flow information corresponding to the flow ID is present in the database. In an embodiment, when the data having the same flow ID as the flow ID is not present in the database, the monitor may perform operation 713. When the data having the same flow ID as the flow ID is present in the database, the monitor may perform operation 715.

According to an embodiment, in operation 713, the monitor may generate data of the flow ID of the received packet and may initialize pieces of detailed information included in the data. For example, the pieces of detailed information may include a point in time when a packet corresponding to the corresponding flow ID is received last or the number of received packets corresponding to the corresponding flow ID. In an embodiment, the monitor may initialize the value of each of the pieces of detailed information as a null value.

According to an embodiment, in operation 715, the monitor may update detailed information about the flow ID of the received packet stored in the database. For example, the monitor may update the point in time when a packet corresponding to the corresponding flow ID is received last, to a point in time when the current packet is received. For another example, the monitor may update the number of received packets corresponding to the corresponding flow ID, to a value obtained by adding '1' to the existing value. However, when the existing value is null, the monitor may update the number of received packets to '1'.

In operation 717, the monitor may transmit the received packet and the flow ID of the packet to the manager and may terminate the operation on the received packet. When the monitor receives a new packet, the monitor may repeat operation 701 to operation 717 again.

Figure 8:
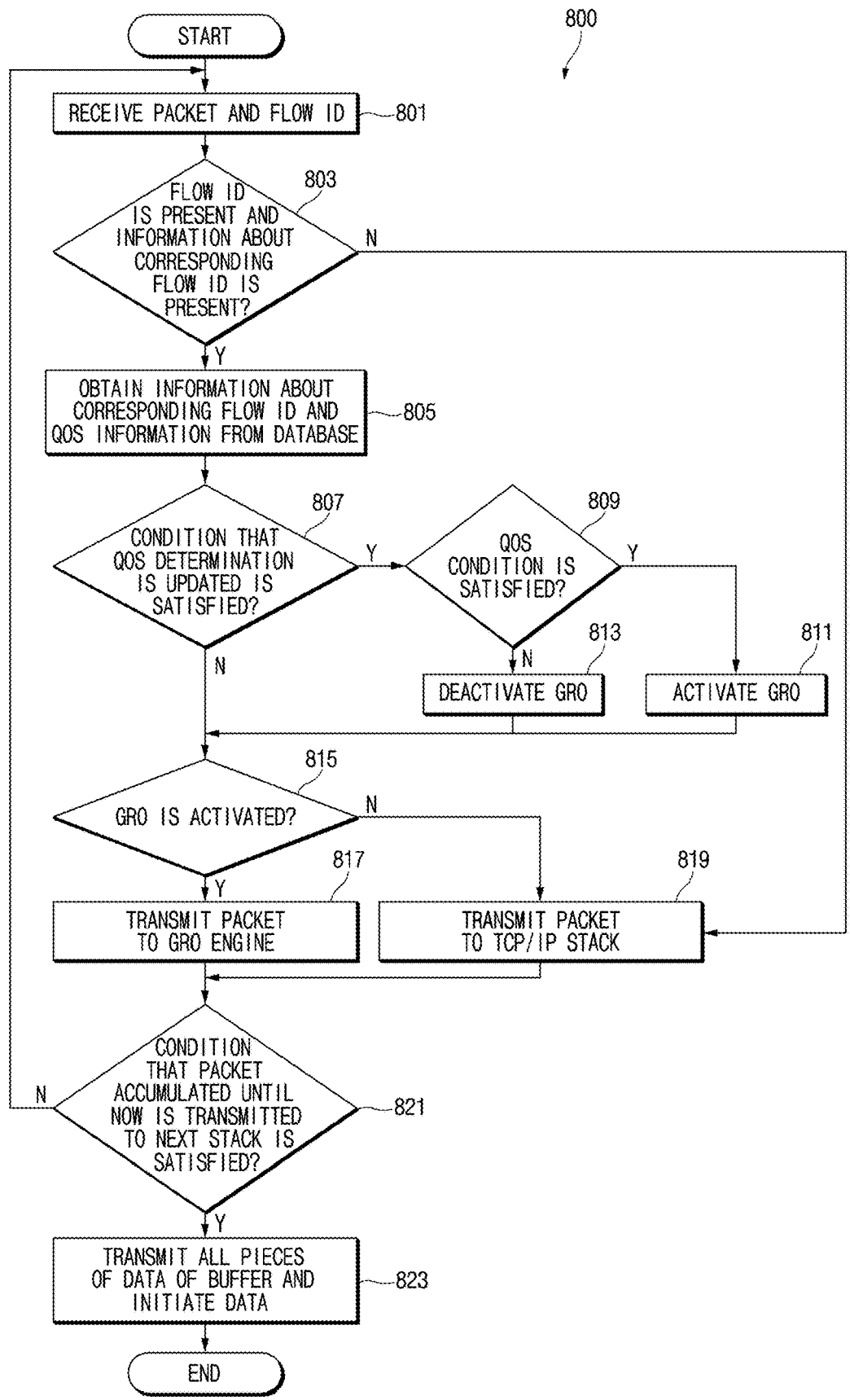
FIG. 8 illustrates a flowchart of an operation of a manager included in an A-GRO module in an electronic device, according to an embodiment

FIG. 8 illustrates a flowchart of an operation of a manager included in an A-GRO module in an electronic device, according to an embodiment.

Referring to FIG. 8, when an electronic device processes data, operation 800 of a manager (e.g., the manager 420 of FIG. 4) included in an A-GRO module (e.g., the packet merging unit 327 of FIG. 3) may include operation 801 to operation 823. According to an embodiment, it may be understood that operation 801 to operation 823 are performed by the processor 230 or the operation cores 232, 233, and 234 illustrated in FIG. 2. For example, it may be understood that operation 801 to operation 823 are the operations performed by the processor or the operation cores after operation 717 illustrated in FIG. 7.

According to an embodiment, in operation 801, the manager may receive the packet and the flow ID of the packet from a monitor (e.g., the monitor 410 of FIG. 4). Alternatively, the manager may receive only the packet from a monitor. For example, in operation 707 illustrated in FIG. 7, the manager may receive the packet and the flow ID of the packet from the monitor or may receive only the packet, based on whether a packet is a TCP packet.

According to an embodiment, in operation 803, the manager may determine whether the received flow ID is present and information about the flow ID is present in a database (e.g., the DB 430 of FIG. 4). In an embodiment, when the received flow ID is present and the information about the flow ID is present in the database, the manager may determine that the corresponding packet is not a packet on which a GRO operation is not capable of being performed, and may perform operation 805. In an embodiment, when the received flow ID is not present and the information about the flow ID is not present in the database, the manager may determine that the corresponding packet is a packet on which a GRO operation is not capable of being performed, and may perform operation 819. According to an embodiment, it may be understood that operation 803 corresponds to operation 603 illustrated in FIG. 6.

According to an embodiment, in operation 805, the manager may obtain detailed information about the corresponding flow ID and information for determining QoS from the database. For example, the database may store detailed information (e.g., the number of received packets or a point in time when a packet is received last) about a flow ID, information for determining QoS, and the flow ID. For example, the information for determining QoS may include, for example, at least one of a threshold value of PPS, an interface configured to perform the GRO operation, an interface not configured to perform the GRO operation, an IP configured to perform the GRO operation, and an IP not configured to perform the GRO operation. For example, the IP configured to perform the GRO operation and/or the IP not configured to perform the GRO operation may be an IP stored in advance in the database. For example, the manager may obtain a point in time when a packet corresponding to the corresponding flow ID is received last or the number of received packets corresponding to the corresponding flow ID, from the database. For example, the number of received packets may be the number of packets received by the monitor and may mean the number of packets received before GRO processing. It may be understood that the detailed information about the corresponding flow ID is information stored in the database in operation 713 to operation 715 of FIG. 7.

According to various embodiments, the information for determining QoS may include at least one of, for example, a threshold value of PPS, an interface configured to perform the GRO operation, an interface not configured to perform the GRO operation, an IP configured to perform the GRO operation, and an IP not configured to perform the GRO operation. For example, the IP associated with the execution of the GRO operation may be a value stored in the database. According to an embodiment, the processor may obtain IP information for determining the execution of the GRO operation from the database. According to an embodiment, the interface may include at least one of an Internet receiving device, modem, a Network Interface Card (NIC), a driver, or a Public Data Network (PDN). For example, the manager may determine whether the GRO operation is performed on the specified PDN. For another example, the manager may determine whether the GRO operation is performed, based on the RAT type (e.g., 3G, 4G, or 5G) of an interface.

In operation 807, the manager may determine whether the condition that QoS determination is updated is satisfied. For example, the manager may determine whether the time of a threshold value or more elapses from a point in time when the QoS determination is updated last. In an embodiment, when the time of the threshold value or more elapses from the point in time when the QoS determination is updated last, the manager may determine that the condition that the QoS determination is updated is satisfied, and may perform operation 809. In an embodiment, when the time of the threshold value or more does not elapse from the point in time when the QoS determination is updated last, the manager may determine that the condition that the QoS determination is updated is not satisfied, and may perform operation 815.

In operation 809, the manager may determine the determination of QoS. For example, the manager may determine whether a QoS condition is satisfied. For example, the QoS condition may include at least one of whether the PPS of an operation core is not less than a threshold value, whether the interface of a packet is configured to perform the GRO operation, or whether IP of a packet is configured to perform the GRO operation. In an embodiment, the PPS may be calculated using a point in time when the QoS determination is updated last, the number of received packets corresponding to the corresponding flow at the updated time, current time, and the number of received packets corresponding to the corresponding flow at the current time. For example, the manager may obtain the PPS by dividing the number of packets ("the number of received packets corresponding to the corresponding flow at the current time"–"the number of received packets corresponding to the corresponding flow at the updated time") received from the updated time to the current time by the time between the current time and the updated time.

According to various embodiments, when the PPS is not less than a threshold value, when the interface (e.g., a network device, an NIC, a driver, and/or a PDN) of the packet is configured to perform the GRO operation, or when the IP of the packet is configured to perform the GRO operation, the manager may determine that the QoS condition is satisfied. In this case, the manager may perform operation 811.

According to various embodiments, when the PPS is less than the threshold value, when the interface of the packet is not configured to perform the GRO operation, or when the IP of the packet is not configured to perform the GRO operation, the manager may determine that the QoS condition is not satisfied. In this case, the manager may perform operation 813.

According to an embodiment, in operation 811, the manager may activate an A-GRO module, for example, GRO engines (e.g., GRO engines 440-1 and 440-2 of FIG. 4).

According to an embodiment, in operation 813, the manager may deactivate the A-GRO module, for example, the GRO engines.

According to an embodiment, in operation 815, the manager may determine whether the A-GRO module is activated. In an embodiment, when the A-GRO module is activated, the manager may perform operation 817. In an embodiment, when the A-GRO module is deactivated, the manager may perform operation 819. According to an embodiment, operation 815 may be skipped.

According to an embodiment, in operation 817, because the A-GRO module is activated, the manager may transmit the packet to the GRO engine to perform the GRO operation on the received packet. According to an embodiment, the GRO engine may combine the packet with a packet accumulated until now. For example, the payload in which the header of the packet is removed may be combined with the payload of the accumulated packet.

According to an embodiment, because it is determined in operation 803 that the received packet is a packet on which the GRO operation is not capable of being performed or because it is determined in operation 815 that the A-GRO module is deactivated, in operation 819, the manager may transmit the packet to the TCP/IP stack without performing the GRO operation on the received packet.

In operation 821, the manager may determine whether a condition that the packet accumulated until now is transmitted to the next stack is satisfied. For example, the manager may combine a new packet with other packets by operation 821 and may determine whether a condition that the combined packet is transmitted to the next stack is satisfied. In an embodiment, when the condition is satisfied, the manager may perform operation 823. In an embodiment, when the condition is not satisfied, the manager may return to operation 801 and may receive a new packet.

According to various embodiments, the condition that the packet is transmitted to the next stack may include at least one of, for example, whether the size of the accumulated packet is not less than a threshold value, whether the number of payloads included in the accumulated packet is not less than a threshold value, or whether the time elapsing from a point in time when a buffer (e.g., the second buffer 450-2 of FIG. 4) is initialized last is not less than a threshold value.

According to an embodiment, in operation 823, the manager may transmit all pieces of data of the buffer, for example, a packet on which the GRO operation is completed, to a TCP/IP stack and may initiate the data stored in the buffer.

According to an embodiment, the electronic device may selectively perform the GRO operation based on the attribute of the packet. For example, the electronic device may determine whether to perform the GRO operation, based on the attribute of the packet determined in operation 803 or operation 809. In this way, the electronic device may reduce the load of an operation core due to the GRO operation.

According to various embodiments, an electronic device (e.g., the electronic device 101 of FIG. 1) may include a communication module (e.g., the communication module 190 of FIG. 1) receiving data transmitted from another electronic device (e.g., the electronic device 104 of FIG. 1), a memory (e.g., the memory 130 of FIG. 1) storing instructions, and at least one processor (e.g., the processor 120 of FIG. 1) electrically connected to the communication module and the memory and including a control core and a plurality of operation cores.

According to an embodiment, the at least one processor may execute the stored instructions to cause the control core to receive the transmitted data from the communication circuit, to classify the received data into data flows of a specified number depending on an attribute of the data, and to respectively allocate the classified data flows to the plurality of operation cores. According to an embodiment, the attribute of the data may include at least one of a sender IP of data, a receiver IP of data, a sender port of data, and a receiver port of data.

According to an embodiment, the at least one processor may execute the stored instructions to cause the plurality of operation cores to integrate packets corresponding to the allocated data flow into one meta packet, to transmit the meta packet to a transmission control protocol/Internet protocol (TCP/IP) stack, and to process the integrated meta packet on the TCP/IP stack.

According to an embodiment, each of the plurality of operation cores may be configured to determine whether to integrate the packets corresponding to the allocated data flow, based on a specified first condition and to integrate the packets corresponding to the allocated data flow into the one meta packet when the integration is determined. For example, the specified first condition may include at least one of packet per second (PPS) information, network interface information, or IP information.

According to an embodiment, each of the plurality of operation cores may be configured to calculate a PPS of the allocated data flow and determine to integrate the packets corresponding to the allocated data flow when the calculated PPS is not less than a threshold value indicated by the PPS information.

According to an embodiment, each of the plurality of operation cores may be configured to determine to integrate the packets corresponding to the allocated data flow when the packets corresponding to the allocated data flow are packets based on a first protocol indicated by the IP information or to determine not to integrate the packets corresponding to the allocated data flow when the packets corresponding to the allocated data flow are packets based on a second protocol indicated by the IP information. For example, the first protocol may include a TCP.

According to an embodiment, the control core may be configured to allocate the classified data flows to the plurality of operation cores based on a manner of "round-robin", "random", "load-aware", "user-defined", or "pre-defined", respectively.

According to an embodiment, each of the plurality of operation cores may be configured to integrate the plurality of packets into the one meta packet sequentially and cumulatively.

According to an embodiment, each of the plurality of operation cores may be configured to integrate the plurality of packets into the one meta packet sequentially and cumulatively until a specified time elapses from a point in time when the plurality of packets start to be cumulatively integrated into the one meta packet and to transmit the integrated meta packet to the TCP/IP stack when the specified time elapses.

According to an embodiment, each of the plurality of operation cores may be configured to integrate the plurality of packets into the one meta packet sequentially and cumulatively until a size of the integrated one meta packet is less than a specified threshold value and to transmit the integrated meta packet to the TCP/IP stack when the size of the integrated one meta packet is not less than the specified threshold value.

According to an embodiment, each of the plurality of operation cores may be configured to integrate the plurality of packets into the one meta packet sequentially and cumulatively until the number of payloads included in the integrated one meta packet is less than a specified threshold value and to transmit the integrated meta packet to the TCP/IP stack when the number of payloads included in the integrated one meta packet is not less than the specified threshold value.

According to various embodiments, a method of processing data may include receiving data transmitted from an external electronic device, classifying the received data into data flows of a specified number depending on an attribute of the data, allocating the classified data flows to a plurality of operation cores, respectively, integrating packets corresponding to the allocated data flow into one meta packet, using each of the plurality of operation cores, transmitting the meta packet to a TCP/IP stack, using each of the plurality of operation cores, and processing the integrated meta packet on the TCP/IP stack, using each of the plurality of operation cores.

According to an embodiment, the integrating of the packets corresponding to the allocated data flow into the one meta packet using each of the plurality of operation cores may include calculating a PPS of the allocated data flow, using each of the plurality of operation cores and integrating the packets corresponding to the allocated data flow into the one meta packet, using each of the plurality of operation cores when the calculated PPS is not less than a specified threshold value.

According to an embodiment, the integrating of the packets corresponding to the allocated data flow into one meta packet using each of the plurality of operation cores may include determining to integrate the packets corresponding to the allocated data flow. The determining to integrate the packets corresponding to the allocated data flow may further include determining to integrate the packets corresponding to the allocated data flow, using each of the plurality of operation cores when the packets corresponding to the allocated data flow are packets based on a first protocol indicated by IP information or determining not to integrate the packets corresponding to the allocated data flow, using each of the plurality of operation cores when the packets corresponding to the allocated data flow are packets based on a second protocol indicated by the IP information. For example, the first protocol may include a TCP.

According to an embodiment, the allocating of the classified data flows to the plurality of operation cores respectively may include allocating data corresponding to the classified data flows to the plurality of operation cores based on a manner of "round-robin", "random", "load-aware", "user-defined", or "pre-defined", respectively.

According to an embodiment, the integrating of the packets corresponding to the allocated data flow into the one meta packet using each of the plurality of operation cores may include integrating the plurality of packets into the one meta packet sequentially and cumulatively, using each of the plurality of operation cores.

According to an embodiment, the integrating of the packets corresponding to the allocated data flow into the one meta packet using each of the plurality of operation cores may include integrating the plurality of packets into the one meta packet sequentially and cumulatively using each of the plurality of operation cores until a specified time elapses from a point in time when the plurality of packets start to be cumulatively integrated into the one meta packet. The transmitting of the meta packet to the TCP/IP stack using each of the plurality of operation cores may include transmitting the integrated meta packet to the TCP/IP stack, using each of the plurality of operation cores when the specified time elapses.

According to an embodiment, the integrating of the packets corresponding to the allocated data flow into the one meta packet using each of the plurality of operation cores may include integrating the plurality of packets into the one meta packet sequentially and cumulatively, using each of the plurality of operation cores until a size of the integrated one meta packet is less than a specified threshold value, and the transmitting of the meta packet to the TCP/IP stack using each of the plurality of operation cores may include transmitting the integrated meta packet to the TCP/IP stack, using each of the plurality of operation cores when the size of the integrated one meta packet is not less than the specified threshold value.

According to an embodiment, the integrating of the packets corresponding to the allocated data flow into the one meta packet using each of the plurality of operation cores may include integrating the plurality of packets into the one meta packet sequentially and cumulatively, using each of the plurality of operation cores until the number of payloads included in the integrated one meta packet is less than a specified threshold value.

The transmitting of the meta packet to the TCP/IP stack using each of the plurality of operation cores may include transmitting the integrated meta packet to the TCP/IP stack, using each of the plurality of operation cores when the number of payloads included in the integrated one meta packet is not less than the specified threshold value. According to embodiments disclosed in the specification, an electronic device may increase the processing efficiency of data. For example, even though the electronic device receives the great amount of data, delayed time for processing the data may be reduced. For this reason, the electronic device may reduce the load of a processor and may prevent heat generation or performance deterioration.

According to embodiments disclosed in the specification, an electronic device may increase the processing efficiency of data. For example, even though the electronic device receives the great amount of data, delayed time for processing the data may be reduced. For this reason, the electronic device may reduce the load of a processor and may prevent heat generation or performance deterioration. Besides, a variety of effects directly or indirectly understood through the disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a communication circuit;
    a memory; and
    a processor electrically connected to the communication circuit and the memory and including a plurality of cores, wherein the processor is operable to:
        receive data including a plurality of packets using the communication circuit;
        identify transmission control protocol/Internet protocol (TCP/IP) packets among the plurality of packets;
        generate, from the TCP/IP packets, a plurality of flows corresponding to the plurality of cores, respectively;
        integrate a plurality of packets of each of the plurality of flows into one meta packet per flow, using each of generic receive offload (GRO) engines corresponding to the plurality of cores respectively, when a packet per second (PPS) for each respective flow of the plurality of flows is equal to or greater than a threshold; and
        transmit the plurality of packets of each of the plurality of flows to a TCP/IP stack without integrating the plurality of packets, when the PPS for each respective flow of the plurality of flows is less than the threshold.

2. The electronic device of claim 1, wherein a GRO engine among a plurality of GRO engines integrates packets of a flow allocated to a core corresponding to the GRO engine into one meta packet.

3. The electronic device of claim 1, wherein each of the plurality of cores is configured to:
    calculate the PPS per flow of the plurality of flows.

4. The electronic device of claim 1, wherein the processor is operable to process user datagram protocol (UDP) packets among the plurality of packets on a network layer without integration of the UDP packets.

5. The electronic device of claim 1, wherein the processor is operable to:
    classify the TCP/IP packets into the plurality of flows, each of the plurality of flows having a same attribute of the data; and
    respectively allocate the plurality of flows to the plurality of cores,
    wherein the attribute of the data includes at least one of a sender IP of a packet, a receiver IP of the packet, a sender port of the packet, and a receiver port of the packet.

6. The electronic device of claim 5, wherein the processor is operable to:
    allocate the plurality of flows to the plurality of cores based on a manner of "round-robin", "random", "load-aware", "user-defined", or "pre-defined", respectively.

7. The electronic device of claim 1, wherein each of the plurality of cores is operable to:
    integrate respectively allocated packets into one meta packet sequentially and cumulatively.

8. The electronic device of claim 7, wherein each of the plurality of cores is operable to:
    integrate the respectively allocated packets into the one meta packet sequentially and cumulatively until a specified time elapses from a point in time when the respectively allocated packets start to be cumulatively integrated into the one meta packet; and
    when the specified time elapses, transmit the one meta packet to the TCP/IP stack.

9. The electronic device of claim 7, wherein each of the plurality of cores is operable to:
    while a size of the one meta packet is less than a specified threshold value, integrate the respectively allocated packets into the one meta packet sequentially and cumulatively; and
    when the size of the one meta packet is equal to or greater than the specified threshold value, transmit the one meta packet to the TCP/IP stack.

10. The electronic device of claim 7, wherein each of the plurality of cores is operable to:

while a number of payloads included in the one meta packet is less than a specified threshold value, integrate the packets into the one meta packet sequentially and cumulatively; and when the number of payloads included in the one meta packet is equal to or greater than the specified threshold value, transmit the one meta packet to the TCP/IP stack.

11. A method of processing data, the method comprising:
receiving data including a plurality of packets using a communication circuit;
identifying transmission control protocol/Internet protocol (TCP/IP) packets among the plurality of packets;
generating, from the TCP/IP packets, a plurality of flows corresponding to a plurality of cores of a processor;
integrating a plurality of packets of each of the plurality of flows into one meta packet per flow, using each of generic receive offload (GRO) engines corresponding to the plurality of cores, respectively, when a packet per second (PPS) for each respective flow of the plurality of flows is equal to or greater than a threshold; and
transmitting the plurality of packets of each of the plurality of flows to a TCP/IP stack without integrating the plurality of packets, when the PPS for each respective flow of the plurality of flows is less than the threshold.

12. The method of claim 11, further comprising:
calculating the PPS of each respective flow of the plurality of flows.

13. The method of claim 11, further comprising:
classifying the TCP/IP packets into the plurality of flows, each of the plurality of flows having a same attribute of the data; and
respectively allocating the plurality of flows to the plurality of cores,
wherein the attribute of the data includes at least one of a sender IP of a packet, a receiver IP of the packet, a sender port of the packet, and a receiver port of the packet.

14. The method of claim 13, wherein respectively allocating the plurality of flows to the plurality of cores includes:
allocating the plurality of flows to the plurality of cores based on a manner of "round-robin", "random", "load-aware", "user-defined", or "pre-defined", respectively.

15. The method of claim 11, wherein integrating the plurality of packets of each of the plurality of flows into the one meta packet per flow includes:
integrating the plurality of packets into the one meta packet per flow sequentially and cumulatively, using the plurality of cores.

16. The method of claim 11, wherein integrating the plurality of packets of each of the plurality of flows into the one meta packet per flow includes:
integrating the plurality of packets into the one meta packet per flow sequentially and cumulatively using the plurality of cores until a specified time elapses from a point in time when the plurality of packets start to be cumulatively integrated into the one meta packet per flow; and
when the specified time elapses, transmitting the one meta packet per flow to the TCP/IP stack.

17. The method of claim 11, wherein integrating of the plurality of packets of each of the plurality of flows into the one meta packet per flow includes:
while a size of the one meta packet per flow is less than a specified threshold value, integrating the plurality of packets into the one meta packet per flow sequentially and cumulatively; and
transmitting the one meta packet per flow to the TCP/IP stack when the size of the one meta packet per flow is equal to or greater than the specified threshold value.

18. The method of claim 11, wherein integrating the plurality of packets of each of the plurality of flows into the one meta packet per flow includes:
while a number of payloads included in the one meta packet per flow is less than a specified threshold value, integrating the plurality of packets into the one meta packet per flow sequentially and cumulatively; and
transmitting the one meta packet per flow to the TCP/IP stack when the number of payloads included in the one meta packet per flow is equal to or greater than the specified threshold value.

* * * * *